(12) United States Patent
Calman et al.

(10) Patent No.: US 9,105,011 B2
(45) Date of Patent: Aug. 11, 2015

(54) PREPOPULATING APPLICATION FORMS USING REAL-TIME VIDEO ANALYSIS OF IDENTIFIED OBJECTS

(75) Inventors: Matthew A. Calman, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 308 days.

(21) Appl. No.: 13/399,831

(22) Filed: Feb. 17, 2012

(65) Prior Publication Data

US 2013/0033522 A1 Feb. 7, 2013

Related U.S. Application Data

(60) Provisional application No. 61/450,213, filed on Mar. 8, 2011.

(51) Int. Cl.
| | |
|---|---|
| *G09G 5/00* | (2006.01) |
| *G06Q 10/10* | (2012.01) |
| *G06Q 30/02* | (2012.01) |
| *G06Q 30/06* | (2012.01) |
| *G06Q 40/02* | (2012.01) |

(52) U.S. Cl.
CPC ............... *G06Q 10/10* (2013.01); *G06Q 30/02* (2013.01); *G06Q 30/06* (2013.01); *G06Q 40/02* (2013.01)

(58) Field of Classification Search
CPC .............................. G06T 19/006; G06T 19/00
USPC .................................. 345/633; 715/224, 226
See application file for complete search history.

(56) References Cited

U.S. PATENT DOCUMENTS

| | | |
|---|---|---|
| 7,016,532 B2 | 3/2006 | Boncyk et al. |
| 7,155,228 B2 | 12/2006 | Rappaport et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |

(Continued)

OTHER PUBLICATIONS

ISA/US Commissioner for Patents, PCT International Search Report and the Written Opinion of the International Searching Authority for International Application No. PCT/US12/48697 date of completion Sep. 24, 2012, date of mailing Oct. 12, 2012.

(Continued)

*Primary Examiner* — Devona Faulk
*Assistant Examiner* — Jin Ge
(74) *Attorney, Agent, or Firm* — Michael A. Springs; Moore & Van Allen PLLC; Patrick B. Horne

(57) ABSTRACT

Embodiments of the invention are directed to methods and apparatuses for populating documents based on identification of objects in an augmented reality environment. The method includes capturing a video stream using a mobile computing device; determining, using a computing device processor, the object; identifying a document associated with the object; populating at least a portion of the document; and submitting the document. The method may also include presenting indicators associated with the user, the identified document, or a financial transaction associated with the document. The method may also include providing recommendations or suggestions to the user related to alternative offers associated with the document. Systems and computer program products for populating forms using video analysis of identified objects are also provided.

17 Claims, 5 Drawing Sheets

(56) References Cited

U.S. PATENT DOCUMENTS

| | | | |
|---|---|---|---|
| 7,526,280 B2 | 4/2009 | Jung et al. | |
| 7,564,469 B2 | 7/2009 | Cohen | |
| 7,565,008 B2 | 7/2009 | Boncyk et al. | |
| 7,680,324 B2 | 3/2010 | Boncyk et al. | |
| 7,775,437 B2* | 8/2010 | Cohen | 235/462.45 |
| 7,792,738 B2 | 9/2010 | Channell | |
| 7,881,529 B2 | 2/2011 | Boncyk et al. | |
| 7,899,243 B2 | 3/2011 | Boncyk et al. | |
| 7,899,252 B2 | 3/2011 | Boncyk et al. | |
| 8,138,930 B1 | 3/2012 | Heath | |
| 8,156,115 B1* | 4/2012 | Erol et al. | 707/728 |
| 8,315,423 B1* | 11/2012 | Jing et al. | 382/100 |
| 2003/0064705 A1 | 4/2003 | Desiderio | |
| 2004/0021584 A1 | 2/2004 | Hartz et al. | |
| 2004/0024709 A1 | 2/2004 | Yu et al. | |
| 2006/0100951 A1 | 5/2006 | Mylet et al. | |
| 2006/0176516 A1* | 8/2006 | Rothschild | 358/1.15 |
| 2007/0140595 A1 | 6/2007 | Taylor et al. | |
| 2007/0185795 A1* | 8/2007 | Petrime et al. | 705/35 |
| 2007/0279521 A1* | 12/2007 | Cohen | 348/376 |
| 2008/0040278 A1* | 2/2008 | DeWitt | 705/44 |
| 2008/0214210 A1 | 9/2008 | Rasanen et al. | |
| 2008/0268876 A1 | 10/2008 | Gelfand et al. | |
| 2009/0094125 A1 | 4/2009 | Killian et al. | |
| 2009/0102859 A1* | 4/2009 | Athsani et al. | 345/619 |
| 2009/0140839 A1 | 6/2009 | Bishop et al. | |
| 2009/0144164 A1 | 6/2009 | Wane et al. | |
| 2009/0171850 A1 | 7/2009 | Yuval | |
| 2009/0182748 A1 | 7/2009 | Walker | |
| 2009/0204511 A1 | 8/2009 | Tsang | |
| 2009/0250515 A1 | 10/2009 | Todd et al. | |
| 2009/0285444 A1* | 11/2009 | Erol et al. | 382/100 |
| 2009/0322671 A1* | 12/2009 | Scott et al. | 345/156 |
| 2010/0130226 A1 | 5/2010 | Arrasvuouri et al. | |
| 2010/0185529 A1 | 7/2010 | Chestnut et al. | |
| 2010/0250581 A1 | 9/2010 | Chau | |
| 2011/0022540 A1 | 1/2011 | Stern et al. | |
| 2011/0034176 A1 | 2/2011 | Lord et al. | |
| 2011/0119155 A1* | 5/2011 | Hammad et al. | 705/26.41 |
| 2011/0164163 A1* | 7/2011 | Bilbrey et al. | 348/333.01 |
| 2011/0202466 A1 | 8/2011 | Carter | |
| 2011/0252311 A1* | 10/2011 | Kay et al. | 715/255 |
| 2013/0031202 A1* | 1/2013 | Mick et al. | 709/217 |

OTHER PUBLICATIONS

PCT, PCT International Search Report and Written Opinion of the International Searching Authority for International Application No. PCT/US2012/027912 date of completion of international search Jun. 8, 2012.

PCT, PCT International search Report and Written Opinion of the International Searching Authority for International Application No. PCT/US12/27892 date of completion of international search Jun. 14, 2012.

PCT, PCT International Search Report and Written Opinion of the International Searching Authority for International Application No. PCT/US12/28008, date of completion of international search May 22, 2012.

PCT, PCT International search Report and Written Opinion of the International Searching Authority for International Application No. PCT/US12/28036, date of completion of international search May 28, 2012.

International Search Report and Written Opinion, corresponding to International Patent Application No. PCT/US12/27890, dated Feb. 5, 2013.

International Preliminary Report on Patentability for International Patent Application PCT/US2012/027912, Mailed Sep. 19, 2013.
International Preliminary Report on Patentability for International Patent Application PCT/US2012/028036, Mailed Sep. 19, 2013.
International Preliminary Report on Patentability for International Patent Application PCT/US2012/028008, Mailed Sep. 19, 2013.
International Preliminary Report on Patentability for International Patent Application PCT/US2012/027890, Mailed Sep. 19, 2013.
International Preliminary Report on Patentability for International Patent Application PCT/US2012/027892, Mailed Sep. 19, 2013.
International Preliminary Report on Patentability for International Application No. PCT/US2012/048697 issued on Feb. 4, 2014.

* cited by examiner

PREPOPULATING APPLICATION FORMS USING REAL-TIME VIDEO ANALYSIS OF IDENTIFIED OBJECTS

CROSS-REFERENCE TO RELATED APPLICATIONS

This application claims priority to U.S. Provisional Patent Application No. 61/450,213, filed Mar. 8, 2011, entitled "Real-Time Video Image Analysis Applications for Commerce Activity," the entirety of which is incorporated herein by reference.

BACKGROUND

Modern handheld mobile devices, such as smart phones and the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common as standardized features. Such features include, but are not limited to, location-determining devices, such as Global Positioning System (GPS) devices; sensor devices, such as accelerometers and touch pads; and high-resolution video cameras.

As the hardware capabilities of such mobile devices have increased, so to have the applications (i.e., software) that rely on the hardware advances. One such example of innovative software is a category known as augmented reality (AR), or more generally referred to as mediated reality. One such example of an AR presentation application platform is Layar, available from Layar, Amsterdam, the Netherlands.

The Layar platform technology analyzes real-time video data, location data, compass direction data and the like in combination with information related to the objects, locations or the like in the video stream to create browse-able "hotspots" or "tags" that are superimposed on the mobile device display, resulting in an experience described as "reality browsing."

In many circumstances it may be useful to be able to identify documents based on real-time capture of images. Presently, individuals are limited in their ability to identify documents associated with objects in the environment. Individuals must search for documents that may or may not be related to the various objects, displays, and images that individuals encounter in the environment. Some documents may not be immediately available to the user. In fact, users may not even know where to look for documents or that a document even exists relating to something in the environment. For example, a person may not know that a product comes with a warranty card that can be completed to get an extended warranty on the product. This difficulty in identifying documents is inconvenient, time consuming, and does not assist the individual.

Further still, the individual must then go through the tedious process of completing forms and documents. Often, documents require repetitive input of information such as addresses, names, and phone numbers. This is also time consuming. In some cases, the documents require obscure information that the individual does not have convenient access to. For example, a document may request information on the individual's previous year tax return. While the individual may be able to locate that information, the inconvenience of having to search for that information is an additional burden on individuals.

Individuals may desire to quickly and easily complete electronic versions of documents and submit them without risking losing paper documents.

Therefore, a need exists to implement real-time video analysis, i.e., AR or the like, to assist the user of mobile devices with identifying, augmenting, and completing documents.

SUMMARY

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for using real-time video analysis, such as AR or the like to assist the user of mobile devices with populating documents based on identification of objects. Through the use of real-time image object recognition, objects can be determined in a real-time video stream and can be matched to documents to assist the user with identifying and populating the document. In specific embodiments, reference images are used to identify objects based on comparison of diagnostic markers and then the associated documents are identified based on information available in a database. In another embodiment disclosed here, the method then populates at least a portion of the document with user-specific information, document-specific information, or financial transaction-specific information. These embodiments are exemplary.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

Some embodiments of the present invention provide a computer-implemented method wherein a mobile device is used to capture a real-time video stream. A processor analyzes the real-time video stream to determine which objects present in the video stream are associated with documents. The processor then identifies the document based on, in some cases, markers associated with the object. In an embodiment, the processor compares the markers to reference markers available in databases. In some embodiments, the processor populates at least a portion of the document with user-specific data. In an embodiment, the mobile device also presents one or more indicators associated with the user or the identified document in the real-time video stream. In still further embodiments, augmenting the document with user data allows the user to complete a financial transaction, such as a balance transfer. In some embodiments, the financial transaction is a purchase, sale, or transfer of funds (e.g., a gift or charitable donation, etc.). In some embodiments, information is presented in accordance with the transaction, such as the remaining balance in the account. Many types of indicators providing both information and potential actions can be presented in the user in accordance with some embodiments of the invention.

Consistent with certain embodiments of the invention, identifying a document from the image captured in the real-time video stream involves analyzing reference images that are available to the user and then comparing identifiable characteristics from the captured images with the reference images. The reference images may be publicly available information, may be available from social networking sites, or may be provided by businesses, government, non-profits, or the financial institution.

Embodiments of the invention also provide an apparatus where the apparatus has a device for capturing a real-time video stream, a computing platform having a processor, a memory in communication with the processor, and logic stored in the memory, executable by the processor, and configured to determine which images from the real-time video stream are associated with a document. The logic may also comprise identification logic stored in the memory, executable by the processor, and configured to identify objects in the video stream. The apparatus further comprises image comparison logic stored in the memory, executable by the processor, and configured to identify a document based on comparison of the object to a reference image, and document population logic stored in the memory, executable by the processor, and configured to populate the document.

In some embodiments, the apparatus also comprises a display for presenting the real-time video stream with one or more indicators, each indicator being associated with the user, the document, or the financial transaction. In further embodiments, the apparatus includes a position system device, wherein the document is identified at least in part on a location where the object is captured determined by the positioning system device. The apparatus may include input devices, output devices, and networking devices for receiving reference images. The apparatus may also include a microphone for receiving an audio recording and be configured to identify the document at least in part from the audio recording.

Embodiments of the invention also provide a computer program product comprising a non-transitory computer-readable medium having computer-executable code stored thereon. In one embodiment, the computer-executable code includes: a first code portion configured to capture, via a mobile device, a real-time video stream, a second code portion configured to analyze the real-time video stream to determine objects; a third code portion configured to identify a document associated with the object in the real-time video stream; a fourth code portion configured to populate at least a portion of the document with user information; and a fifth code portion configured to present information related to the document. In some embodiments, the computer program product also includes an additional code portion configured to provide offers associated with the document.

The features, functions, and advantages that have been discussed may be achieved independently in various embodiments of the present invention or may be combined with yet other embodiments, further details of which can be seen with reference to the following description and drawings

BRIEF DESCRIPTION OF THE DRAWINGS

Figure 1:
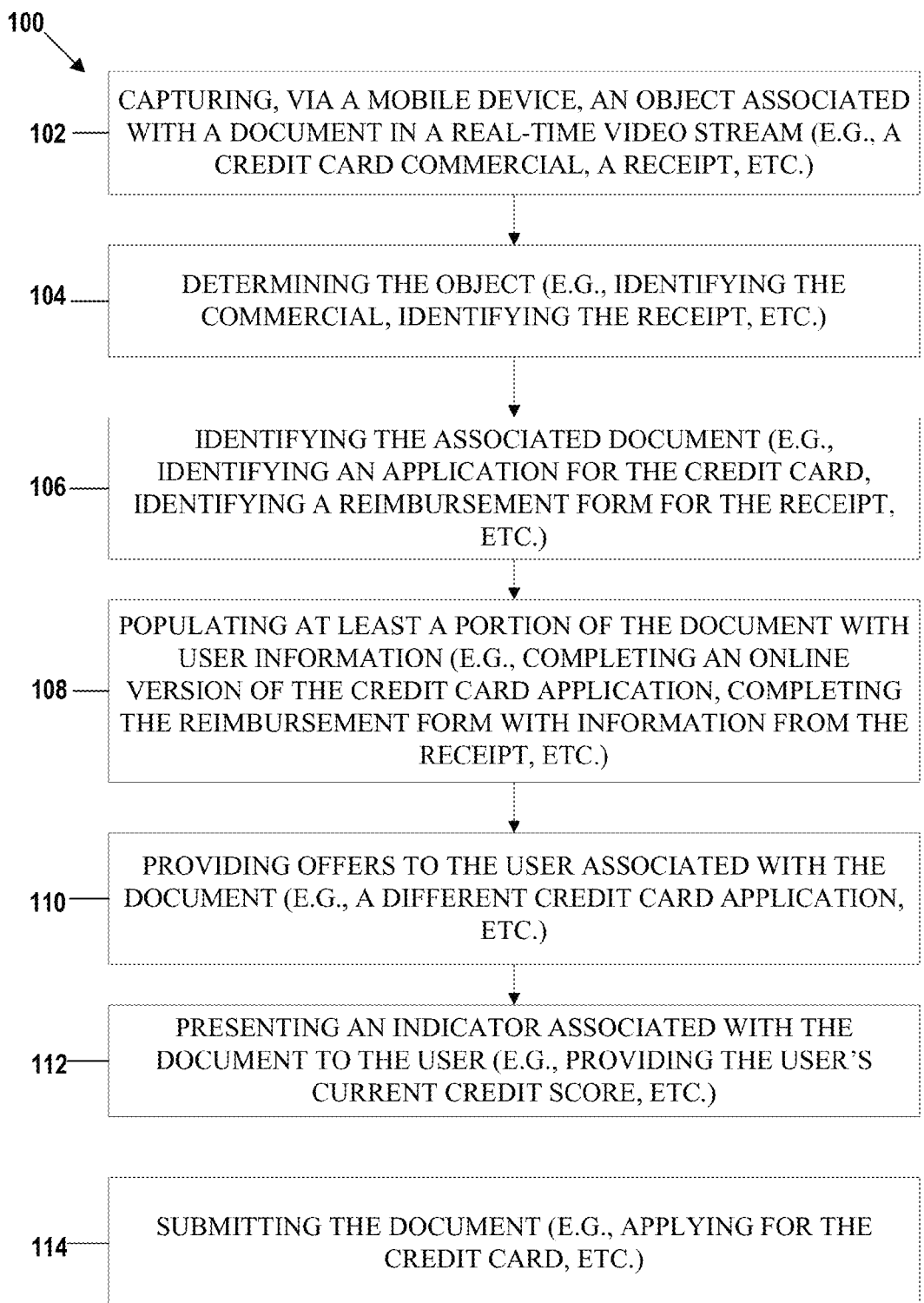
Figure 2:
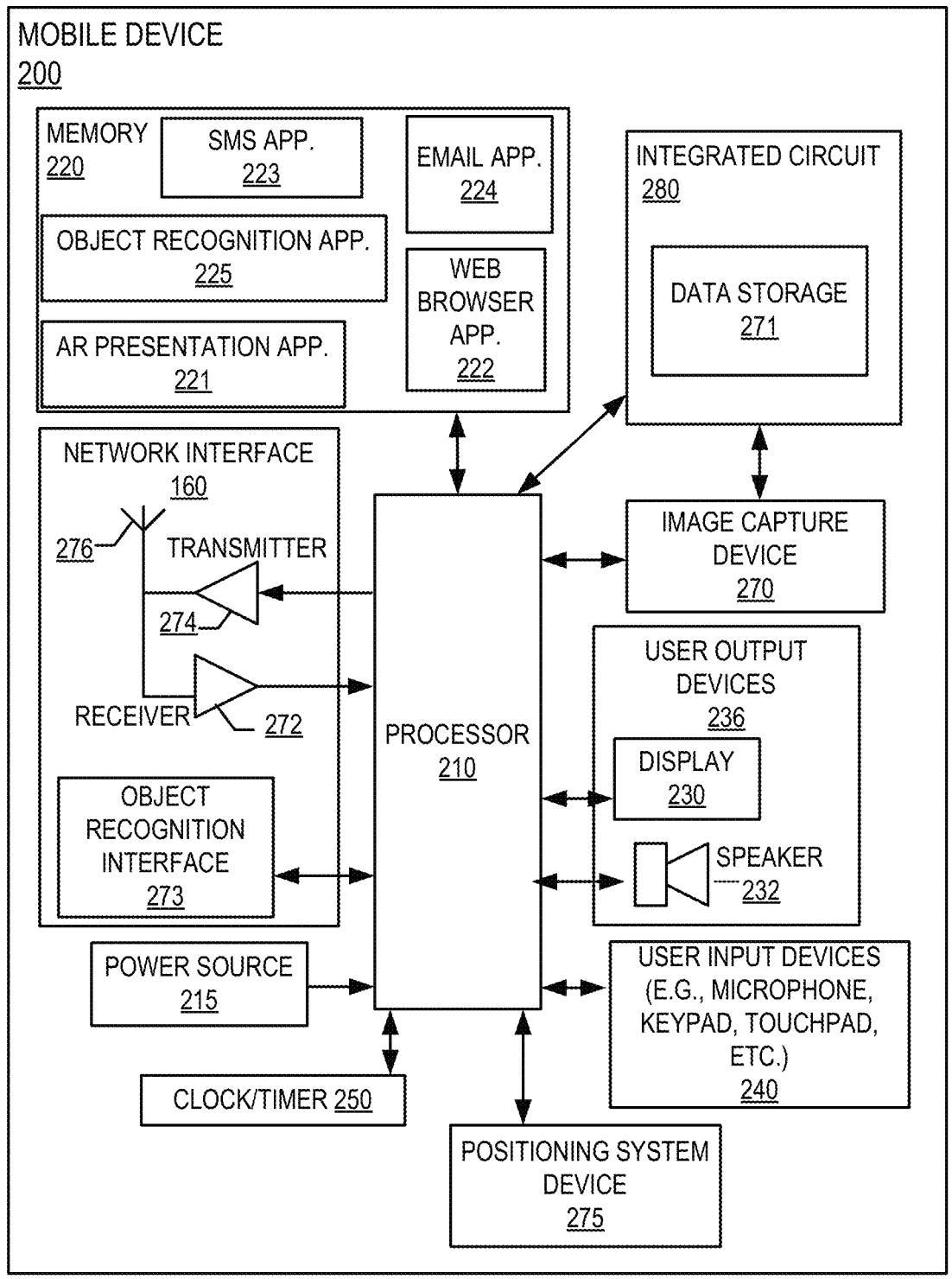
Figure 3:
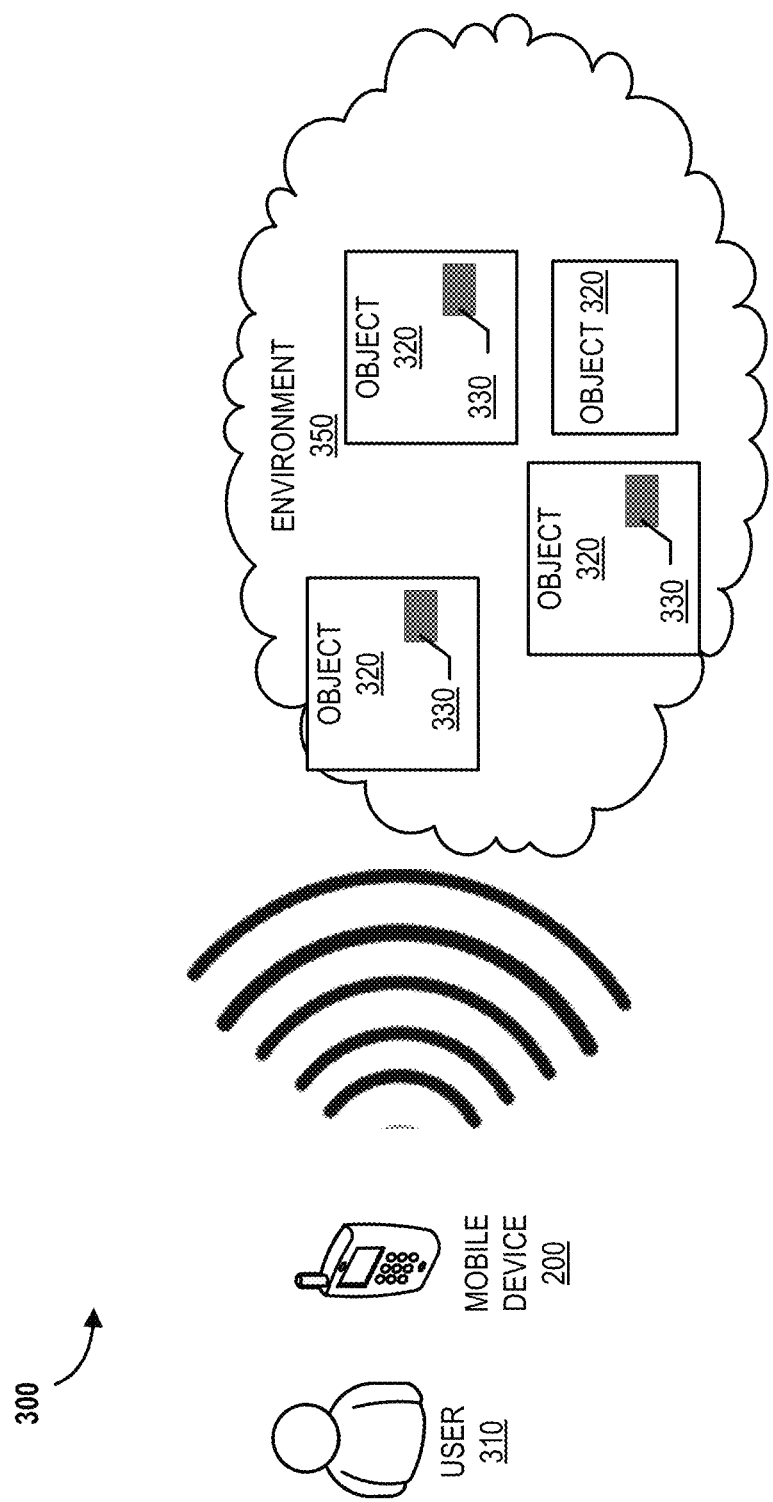
Figure 4:
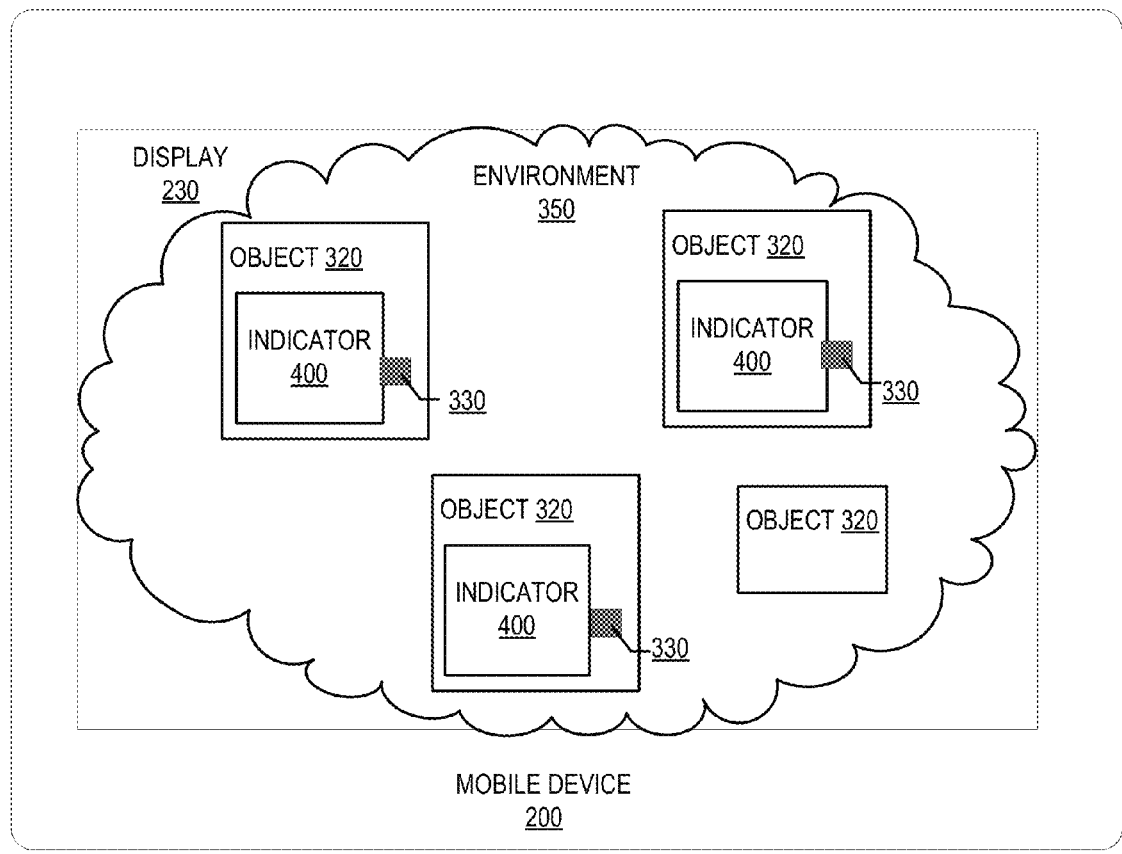
Figure 5:
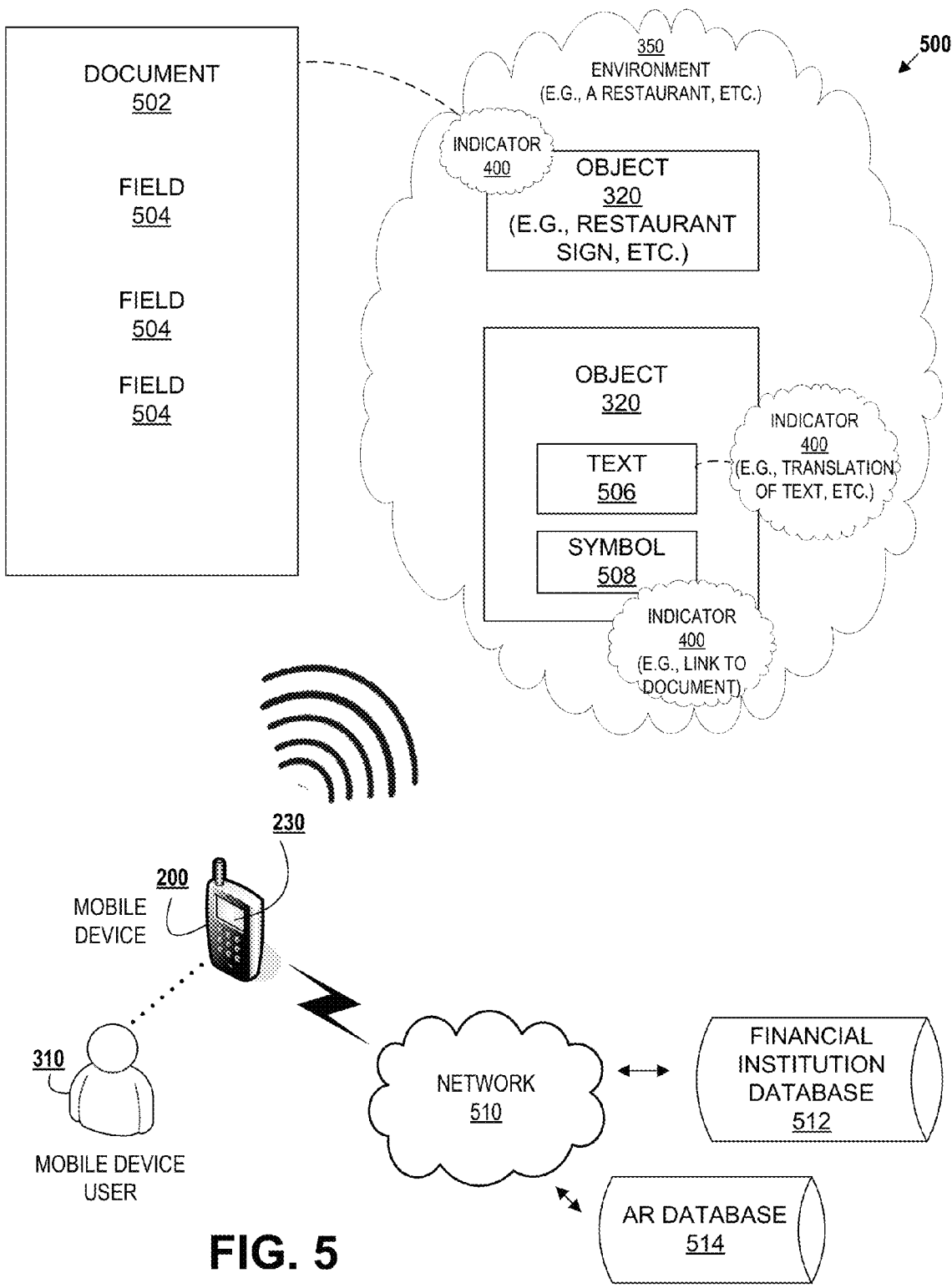

Having thus described embodiments of the invention in general terms, reference will now be made to the accompanying drawings, which are not necessarily drawn to scale, and wherein:

FIG. 1 is a flow chart of a method for populating documents associated with objects in a real-time video stream in accordance with an embodiment of the invention;

FIG. 2 is a block diagram illustrating a mobile device, in accordance with an embodiment of the invention;

FIG. 3 is a block diagram illustrating an AR environment, in accordance with an embodiment of the invention;

FIG. 4 is a block diagram illustrating a mobile device, in accordance with an embodiment of the invention; and FIG. 5 is a block diagram illustrating an AR environment wherein the user is presented with a document, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for using real-time video analysis, such as AR, to augment documents based on identification of objects in the augmented reality environment.

The methods, systems, computers programs and the like disclosed herein use real-time vision object recognition to identify objects such as signs, text, advertisements, receipts, warranty cards, in the real-time video stream and identify documents associated with the objects. Once the object is determined, the processor identifies the document and in some cases populates at least a portion of the document. In specific embodiments, images stored in a database will be used to identify diagnostic markers of objects in the real-time video stream. In other embodiments, indicators relating to the user, the document, or the financial transaction associated with the document will be presented to the user in the real-time video stream. The indicators may merely provide information to the user or may allow the user to provide input in how to complete the document.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

FIG. 1 illustrates a general process flow of a computer-implemented method 100 for augmenting documents based on identification of an object in a real-time video stream in accordance with an embodiment of the invention. As represented by block 102 a mobile device is used to capture an object associated with a document in a real-time video stream. Then, as represented by block 104 a processor determines the object by analyzing the real-time video stream and identifying objects such as symbols and text. The processor may compare captured images of the object to reference images. Then, as represented by block 106, the processor then identifies the document associated with the object. The processor than populates at least a portion of the document with user information, as represented by block 108. In some embodiments, offers associated with the document are provided to the user, as represented by block 110. In an embodiment depicted in block 112, the processor presents an indicator in the real-time video. In still further embodiments shown in block 114, the processor submits the document after populating the document with user information. Embodiments of the computer-implemented method 100, and systems and apparatus for performing the computer-implemented method 100, are described in greater detail below with reference to FIGS. 1-5.

In block 102, the computer-implemented method 100 captures, via a mobile device, an object associated with a document. In an embodiment, the mobile device captures the object in a real-time video stream. For example, the user may activate a video camera on a mobile device and pan the video camera over an environment comprising at least one object. In another embodiment, the computer-implemented method 100 captures the object by receiving a file comprising a video stream. It should be understood that the mobile device may capture the object in a variety of ways, such as via still pictures, through viewing of a video clip on the internet, or other means, and that use of a video camera is only intended to describe an exemplary embodiment.

In an embodiment, the object is associated with a document. In one embodiment, the object is an advertisement, commercial, or offer. For example, the object may be a credit card commercial associated with an application for the credit card. In another embodiment, the object is a product of a financial transaction. For example, the object may be a receipt. The mobile device may capture the receipt and associate it with a reimbursement request by the user or identify a warranty card associated with the product identified in the receipt. Still further, the receipt may be associated with a sweepstakes or contest, which is then entered based on submission of a form with information derived from the receipt (e.g., proof of purchase, date of purchase, etc.). In a further embodiment, the object is associated with a personal document of the user. For example, the user may capture an image of a plane ticket in a real-time video stream. The processor identifies the flight number on the plane ticket, associates the flight number with an itinerary for the user, and populates the itinerary with the gate number, status, or other information related to the flight. In a further embodiment, the processor retrieves up-to-date information regarding the flight and updates the itinerary as needed.

In some embodiments, the object is associated with an organization such as a business or non-profit. For example, the object may be the organization's logo, color scheme, icon, trademark, name, etc. When the object is determined, a document may be identified that is associated with the organization. For example, a job listing, review form, feedback form, or other document that can be completed with at least a portion of the user's information may be identified.

In an embodiment, the object is a document that contains information. The mobile device captures the document, the information in the document is extracted, and the data is transferred to a second document that is associated with the object. For example, a user may capture a W2 tax form provided by the user's employer in a real-time video. The method determines that the object (the W2) is associated with the user's 1040 federal income tax form, extracts the information stored in the W2, and automatically populates the 1040 with the data extracted from the W2. Often, personal documents of the user, such as driver's license, passport, social security card, business card, etc., will contain information that is used to complete other forms. This information can be extracted, stored, and used in other documents through the computer-implemented method.

In a still further embodiment, the object is an application, document, or image displayed on the screen of another mobile device. The mobile device captures an image of the screen, determines an object on the screen, and identifies a document associated with the object. For example, a user may capture a real-time video of an application operating on another individual's mobile device. The processor determines the object, i.e., the application, and identifies an order form associated with the application. The processor may also populate at least a portion of the order form for the user and in some cases submit the order form.

In a still further embodiment, the object is text that is captured in the real-time video. For example, the user may capture the text in a real-time video. The document associated with the text may be a translation of the text, such as a translation from a foreign language to a language that the user is able to read. Still further, the document may be a definition of a word in the text, such as a word selected by the user through interaction with an indicator. In a further embodiment, the text is a description of the object identified by the text. For example, the method may capture the name of a book in the real-time video screen and direct the user to an online review site for the book.

In some embodiments, the object is associated with the user's social networking profile. For example, the user may capture an object in a real-time video stream and populate the user's social networking profile based on the object. In one example, the user captures objects that the user likes or is interested in order to update the user's social networking profile. The user may capture a movie poster in a video stream and update the user's social networking profile with the information that user likes the movie. In an embodiment, the method updates the user's current activity in the user's social networking profile based on an object that is captured in the video stream. In the previous movie poster example, the method may update the user's profile to indicate that the user is currently going to the movie.

In block 104, the computer-implemented method 100 determines the object. In some embodiments, the computer-implemented method 100 determines the object based on comparison of an image of the object to a reference image. In some embodiments, objects are determined based on diagnostic markers associated with the object. In an embodiment, the computer-implemented method 100 analyzes the real-time video stream to identify objects and then compares the identified object to reference images stored in a database. The database may be integral with the mobile device or remotely accessible to the mobile device, such as over a network. The processor may also analyze the real-time video stream to identify the location of the video, the time of the video, or other distinguishing characteristics of the real-time video stream. These distinguishing characteristics may be used to assist the computer-implemented method in identifying the object or objects in the real-time video stream.

Furthermore, in some instances, an object may include one or more markers identified by an object recognition application 225 that leads the object recognition application 225 to associate an object with more than one document in the data storage. Markers are diagnostic characteristics of objects that can be used to identify the object. In such instances, the user may be presented with multiple candidate documents and may opt to choose the appropriate identification or input a different identification. The multiple candidates may be presented to the user by any means. For instance, in one embodiment, the candidates are presented to the user as a list wherein the "strongest" candidate document is listed first based on reliability of the association. Upon input by the user identifying the object, the object recognition application 225 may "learn" from the input and store additional markers in order to avoid multiple identification candidates for the same object in future identifications.

In block 106, the computer-implemented method 100 identifies a document associated with the object. In an embodiment, the database storing the reference images also includes associated documents. For example, when the computer-implemented method 100 identifies a match for the image of the object captured in the real-time video stream, the computer-implemented method receives information on the associated document. In an embodiment, the method receives a link to an online document, such as a form available on a webpage. In another embodiment, the method receives a file comprising the document, such as a scanned document or a fillable document. In some embodiments, the method receives an image of a document and creates the document for use by the user. For example, a non-fillable document may be received by the method as an electronic image. The method may have the functionality to create a document based off of the image such that fillable fields are provided to the user. As will be discussed, in some embodiments, these fields are automatically populated with the user's information by the method.

In a still further embodiment, the method populates a document without completing a form. For example, a user may identify a document that provides entry into a contest. Rather than completing a form, however, the user may be able to submit the document by providing the information to the contest organizer. The method may identify the information that must be provided to the contest organizer and provide some or all of the information to the contest organizer in an acceptable manner to the organizer, such as via email, file transfer protocol, over the web, via text message, etc. In this manner, documents are deconstructed into information that is provided on the document and then that information is manipulated by the method, e.g., identified, provided, submitted, etc., to assist the user in identifying, augmenting, and submitting forms and documents.

In block 108, the computer-implemented method 100 populates at least a portion of the document with information. In an embodiment, the information is user information such as the user's demographic, professional, financial, or personal information. The information may be provided by the user, provided by the financial institution, or available publicly. For example, the user may update a data storage on the mobile device with the user's contact information and personal information (e.g., driver's license number, social security number, height, weight, age, birthdate, family information, etc.). In some embodiments, the user's financial accounts can be provided in documents, for example in purchase orders or the like. In another embodiment, the method populates the document with current information, such as the date, time, or location. It should be understood that any type of information may be populated into a document based on the requirements of the document and the information available to the computer-implemented method. Further, the computer-implemented method 100 is able to gather information in a variety of ways, such as by receiving the information from the user, from the financial institution, or from the mobile device (e.g., clocks and positioning system devices). Thus, the computer-implemented method 100 is flexible in expanding the types of documents that can be augmented with user information.

In an embodiment, the user information is stored for future use as the user information is identified. In some embodiments, the user information is stored in a data storage on the mobile device but in other embodiments the user information is stored remotely from the mobile device. The user information may be encrypted for security purposes. In still further embodiments, the user information is identified from a source other than the user but then the user is prompted to confirm the information. For example, the computer-implemented method 100 may determine the user's address from publicly available records but confirm the address with the user before entering the address in a document.

In block 110, the computer-implemented method 100 provides offers to the user. In an embodiment, the offer is provided based in part on the document. The offer may be for competitive products to the product related to the document, such as a competitive credit card application. In a still further embodiment, the offer provided to the user may be one that the system determined to be likely used by the user. This is based on the transactional data, biographical data, social network data, publicly available information, and the like, of the user. In one embodiment, the computer-implemented method provides an offer associated with the document in combination with the time or location. For example, if the user is updating a personal itinerary with a flight number captured from a plane ticket, the method may provide an offer to an airport coffee shop in the morning and a hotel local to the airport in the evening. In one embodiment of the invention, the offer is an advertisement. For example, the offer may be an advertisement for a product or service in a business related to the document. In other embodiments, the offer may include a coupon, a solicitation, or a request for volunteer service, etc. The offer may be customized for the user with data from the user's financial accounts. The offer may be in visual (e.g., a written advertisement or a picture, etc.) or audible (e.g., a recording, a jingle, etc.) format.

In block 112, the computer-implemented method 100 presents an indicator to the user. The indicator may relate to the user, to the document, or to a financial transaction completed in association with the document. In some embodiments, the indicator provides the information that will be populated in the document. For example, the document may be displayed in a screen and the indicator displays the user's information that will be populated in the document. In another embodiment, the indicator may be a prompt for the user to interact with information that will be used to populate. For example, the mobile device may have two phone numbers for the user and allow the user to select from between the phone numbers by tapping on the screen. In another embodiment, the indicator relates to the document. For example, the indicator may provide a deadline for the submission of the document. The indicator may also be the address to which the document must be sent, information on related documents that have been completed previously (e.g., a previous tax form submitted by the user, etc.), or the result of submission of the document (e.g., the length of the warranty, etc.). In a still further embodiment, the indicator relates to a financial transaction that will be completed by submission of the document. For example, a document may be a transfer request and the indicator may display the balance in the transferring account and/or the balance in the receiving account after the transfer is completed. In another example, the indicator may convert the transaction from one currency to another currency so that the user may better understand the terms of the transaction.

In some embodiments, the user provides input in response to the indicator. As discussed the user may provide input to the method in a variety of manners. For example, the user may select an indicator using a touch-sensitive display. Optionally, the user may use a keyboard or other input device to provide input. In some embodiments, the method is capable of receiving voice commands when the user speaks into a receiver on the mobile device. It should be understood that generic commands, such as "cancel," "stop," or "submit" are also possible.

In block 114, the computer-implemented method 100 submits the document. In an embodiment, the computer-implemented method 100 submits the document according to the user input. The method may approve a purchase of a product or approve the transfer of funds as part of a gift or charitable donation through a submission of a document. In some embodiments, the method submits the document to the financial institution, which thereafter completes the transaction.

It should be understood that every step does not need to occur in the order described herein, or even need to occur at all. Different steps in the computer-implemented method can be skipped or moved around and still accomplish the goal of populating a document based on identification of objects in a real-time video stream. The steps disclosed herein are not limiting to the exact order discussed.

FIG. 2 illustrates an embodiment of a mobile device 200 that may be configured to execute object recognition and Augmented Reality functionality, in accordance with specific embodiments of the present invention. A "mobile device" 200 may be any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, or the like.

The mobile device 200 may generally include a processor 210 communicably coupled to such devices as a memory 220, user output devices 236, user input devices 240, a network interface 260, a power source 215, a clock or other timer 250, an image capture device 270 (e.g., a camera), a positioning system device 275 (e.g., a Global Positioning System or GPS device), one or more integrated circuits 280, etc.

In some embodiments, the mobile device and/or the server access one or more databases or data stores (not shown in FIG. 2) to search for and/or retrieve information related to the object and/or marker. In some embodiments, the mobile device and/or the server access one or more data stores 271 local to the mobile device and/or server and in other embodiments, the mobile device and/or server access data stores remote to the mobile device and/or server. In some embodiments, the mobile device and/or server access both a memory and/or data store local to the mobile device and/or server as well as a data store remote from the mobile device and/or server.

The processor 210, and other processors described herein, may generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 may be allocated between these devices according to their respective capabilities. The processor 210 thus may also include the functionality to encode and interleave messages and data prior to modulation and transmission. The processor 210 may additionally include an internal data modem. Further, the processor 210 may include functionality to operate one or more software programs or applications, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 may also be capable of operating applications, such as an AR presentation application 221. The AR presentation application 221 may be downloaded from a server and stored in the memory 220 of the mobile device 200. Alternatively, the AR presentation application 221 may be pre-installed and stored in a memory in the integrated circuit 280 or operated directly from a website operably linked to the mobile device 200 through the network interface 260. In embodiments, where the AR presentation application 221 is pre-installed or run from a website, the user may not need to download the AR presentation application 221 from a server.

The memory 220 may also include an object recognition application 225 configured to identify objects in still shots or video. In an embodiment, the object recognition application 225 identifies diagnostic features of documents or objects in the still shot or video and then compares the diagnostic features to a database of reference images using algorithms. The object recognition application 225 may be stored on the mobile device 200 or may communicate with a remote server via an object recognition interface 273 in association with the network interface 260. The object recognition application 225 may be downloaded from a server and stored in the memory 220 of the mobile device 200. Alternatively, the object recognition application 225 may be pre-installed and stored in a memory in an integrated circuit. In such an embodiment, the user may not need to download the object recognition application 225 from a server.

The user 310 may opt to execute the object recognition application 225 or the AR presentation application 221 at any desired moment and begin video capture and analysis. However, in some embodiments, the object recognition application and/or AR presentation application 221 includes an "always on" feature in which the mobile device 200 is continuously capturing video and analyzing the objects 320 within the video stream. In such embodiments, the AR presentation application 221 may be configured to alert the user 310 that a particular object 320 has been identified. The user 310 may set any number of user preferences to tailor the mobile device 200 to their needs. For instance, the user 310 may opt to only be alerted if a specific object 320 is identified. Additionally, it will be appreciated that the "always on" feature in which video is continuously captured may consume the mobile device power source 215 more quickly. Thus, in some embodiments, the "always on" feature may disengage if a determined event occurs such as low power source 215, low levels of light for an extended period of time (e.g., such as if the mobile device 200 is in a user's pocket obstructing a clear view of the environment from the mobile device 200), if the mobile device 200 remains stationary (thus receiving the same video stream) for an extended period of time, the user sets a certain time of day to disengage, etc. Conversely, if the "always on" feature is disengaged due to the occurrence of such an event, the user 310 may opt for the "always on" feature to re-engage after the duration of the disengaging event (e.g., power source 215 is re-charged, light levels are increased, etc.).

In some embodiments, the processor 210 may also be capable of operating one or more applications, such as one or more applications functioning as an artificial intelligence ("AI") engine. The processor 210 may recognize objects that it has identified in prior uses by way of the AI engine. In this way, the processor 210 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

In another embodiment, the AI engine also assists in populating the document. In an embodiment, the AI engine evaluates the document and determines the data to use in populating the document. For example, the AI engine may categorize information in libraries, such as a work information library compared to a personal information library, and populate forms with information from the appropriate library. For example, a business credit card application may be completed with the user's work email, work phone number, and work address, whereas a personal credit card application may be completed with the user's personal email, home phone number, and home address from the libraries. The AI engine may identify the library to use from context associated with the document, such as the name of the credit card, or from information available in the database. In an embodiment, the AI engine may prompt the user, such as through use of an indicator, to select which library to use from a plurality of libraries, although in another embodiment the AI engine determines the library without input from the user. In a further embodiment, the user is able to alter the library by interacting with the mobile device if the user desires to use a different library. For example, a mobile device may be used by two individuals. The AI engine may construct a library for both individuals and allow the user to select which of the libraries to use.

The integrated circuit 280 may include the necessary circuitry to provide the object recognition and/or AR functionality to the mobile device 200. Generally, the integrated circuit 280 will include data storage 271 which may include data associated with the objects within a video stream that the object recognition application 225 and/or AR presentation application 221 identifies as having certain marker(s) (discussed in relation to FIG. 3). The integrated circuit 280 and/or data storage 271 may be an integrated circuit, a microprocessor, a system-on-a-chip, a microcontroller, or the like. As discussed above, in one embodiment, the integrated circuit 280 may provide the functionality to the mobile device 200.

Of note, while FIG. 2 illustrates the integrated circuit 280 as a separate and distinct element within the mobile device 200, it will be apparent to those skilled in the art that the object recognition functionality of the integrated circuit 280 may be incorporated within other elements in the mobile device 200. For instance, the functionality of the integrated circuit 280 may be incorporated within the mobile device memory 220 and/or the processor 210. In a particular embodiment, the functionality of the integrated circuit 280 is incorporated in an element within the mobile device 200 that provides object recognition capabilities to the mobile device 200. Moreover, the functionality may be part of the firmware of the mobile device 200. Still further, the integrated circuit 280 functionality may be included in a removable storage device such as an SD card or the like.

The processor 210 may be configured to use the network interface 260 to communicate with one or more other devices on a network. In this regard, the network interface 260 may include an antenna 276 operatively coupled to a transmitter 274 and a receiver 272 (together a "transceiver"). The processor 210 may be configured to provide signals to and receive signals from the transmitter 274 and receiver 272, respectively. The signals may include signaling information in accordance with the air interface standard of the applicable cellular system of the wireless telephone network that may be part of the network. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 200 may also be configured to operate in accordance with non-cellular communication mechanisms, such as via a wireless local area network (WLAN) or other communication/data networks.

The network interface 260 may also include an object recognition interface 273 in order to allow a user to execute some or all of the above-described processes with respect to the object recognition application 225 and/or the integrated circuit 280. The object recognition interface 273 may have access to the hardware, e.g., the transceiver, and software previously described with respect to the network interface 260. Furthermore, the object recognition interface 273 may have the ability to connect to and communicate with an external object-oriented data storage on a separate system within the network as means of recognizing the object(s) in the video stream.

As described above, the mobile device 200 may have a user interface that includes user output devices 236 and/or user input devices 240. The user output devices 236 may include a display 230 (e.g., a liquid crystal display (LCD) or the like) and a speaker 232 or other audio device, which are operatively coupled to the processor 210. The user input devices 240, which may allow the mobile device 200 to receive data from a user 310, may include any of a number of devices allowing the mobile device 200 to receive data from a user 310, such as a keypad, keyboard, touch-screen, touchpad, microphone, mouse, joystick, stylus, other pointer device, button, soft key, and/or other input device(s).

The mobile device 200 may further include a power source 215. Generally, the power source 215 is a device that supplies electrical energy to an electrical load. In one embodiment, power source 215 may convert a form of energy such as solar energy, chemical energy, mechanical energy, etc. to electrical energy. Generally, the power source 215 in the mobile device 200 may be a battery, such as a lithium battery, a nickel-metal hydride battery, or the like, that is used for powering various circuits, e.g., the transceiver circuit, and other devices that are used to operate the mobile device 200. Alternatively, the power source 215 may be a power adapter that can connect a power supply from a power outlet to the mobile device 200. In such embodiments, a power adapter may be classified as a power source "in" the mobile device.

The mobile device 200 may also include a memory 220 operatively coupled to the processor 210. As used herein, memory may include any computer readable medium configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory may additionally or alternatively include an electrically erasable programmable read-only memory (EEPROM), flash memory or the like.

The memory 220 may store any of a number of applications or programs which comprise computer-executable instructions/code executed by the processor 210 to implement the functions of the mobile device 200 described herein. For example, the memory 220 may include such applications as an object recognition application 225, an augment reality (AR) presentation application 221 (described infra in relation to FIG. 2), a web browser application 222, a Short Message Service (SMS) application 223, an electronic mail (i.e., email) application 224, etc.

Referring to FIG. 3, a block diagram illustrating an AR experience 300 in which a user 310 utilizes the mobile device 200 to capture a video stream that includes an environment 350 is shown. As denoted earlier, the mobile device 200 may be any mobile communication device. The mobile device 200 has the capability of capturing a video stream of the surrounding environment 350. The video capture may be by any means known in the art. In one particular embodiment, the mobile device 200 is a mobile telephone equipped with an image capture device capable of video capture.

The environment 350 contains a number of objects 320. Some of such objects 320 may include a marker 330 identifiable to an object recognition application that is either executed on the mobile device 200 or within the wireless network. A marker 330 may be any type of marker that is a distinguishing feature that can be interpreted by the object recognition application to identify specific objects 320. For instance in identifying a document, a marker may be some type of identifiable feature, such as objects, logos, artwork, names, symbols, color schemes, products, text, locations and other features that identify the object 320. In some embodiments, the marker 330 is a code such as a barcode, QR code, or other identifying mark. In some embodiments, the marker 330 may be audio and the mobile device 200 may be capable of utilizing audio recognition to identify words or the unique qualities of a recording associated with a document. For example, the mobile device 200 may identify the audio associated with a credit card commercial and identify the credit card application associated with the commercial. The marker 330 may be any size, shape, etc. Indeed, in some embodiments, the marker 330 may be the entire object 320 such as the document that will be augmented.

In some embodiments, the mobile device and/or server accesses one or more other servers, social media networks, applications and/or the like in order to retrieve and/or search for information useful in performing object recognition. In some embodiments, the mobile device and/or server accesses another application by way of an application programming interface or API. In this regard, the mobile device and/or server may quickly search and/or retrieve information from the other program without requiring additional authentication steps or other gateway steps.

In some embodiments, the mobile device 200 and/or the server access one or more databases or datastores (not shown) to search for and/or retrieve information related to the object and/or marker. In some embodiments, the mobile device 200 and/or the server accesses one or more datastores local to the mobile device 200 and/or server and in other embodiments, the mobile device 200 and/or server access datastores remote to the mobile device and/or server. In some embodiments, the mobile device 200 and/or server access both a memory and/or datastore local to the mobile device 200 and/or server as well as a datastore remote from the mobile device 200 and/or server The marker 330 may be anything that enables the mobile device 200 to interpret what the object is. For example, the mobile device 200 may capture a series of numbers on the façade of a building, collect the user's position using the positioning system device 275 and correlate that position and the numbers to being at a specific business having an address available online. The mobile device 200 may then use the web browser application 222 and network interface 260 to access the business's employment website and identify a job application document for the business. Accordingly, the markers 330 associated with the business's building and other available information were sufficient to identify the document.

While FIG. 3 illustrates that the objects 320 with markers 330 only include a single marker 330, it will be appreciated that the object 320 may have any number of markers 330 with each equally capable of identifying the object 320. Similarly, multiple markers 330 may be identified by the mobile device 200 such that the combination of the markers 330 may be utilized to identify the object 320.

In some embodiments, a marker 330 may be the location of the object 320. In such embodiments, the mobile device 200 may utilize Global Positioning System (GPS) hardware and/or software or some other location-determining mechanism to determine the location of the user 310 and/or the object 320. As noted above, a location-based marker 330 could be utilized in conjunction with other non-location-based markers 330 and recognized by the mobile device 200 to identify the object 320. However, in some embodiments, a location-based marker 330 may be the only marker 330. For instance, in such embodiments, the mobile device 200 may utilize GPS software to determine the location of the user 310 and a compass device or software to determine what direction the mobile device 200 is facing in order to identify the object 320. In still further embodiments, the mobile device 200 does not utilize any GPS data in the identification. In such embodiments, markers 330 utilized to identify the object 320 are not location-based.

FIG. 4 illustrates the mobile device 200, specifically the display 230 of the mobile device 200, wherein the mobile device 200 has executed an object recognition application 225 and an AR presentation application 221 to present within the display 230 indications of recognized objects within the video stream (i.e., surrounding environment 350). The mobile device 200 is configured to rely on markers 330 to identify objects 320, for example an advertisement, and identify a document associated with the identified object 320. In some embodiments, mobile device 200 displays an indicator 400 on the mobile device display 230 in conjunction with display of the video stream. As illustrated, if an object 320 does not have any markers 330 (or at least enough markers 330 to yield object identification), the object 320 will be displayed without an associated indicator 400. In an embodiment, the indicator 400 includes at least some data populating a document.

The object recognition application 225 may use any type of means in order to identify desired objects 320. For instance, the object recognition application 225 may utilize one or more pattern recognition algorithms to analyze objects in the environment 350 and compare with markers 330 in data storage which may be contained within the mobile device 200 (such as within integrated circuit 280) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 320 within the video stream, in some embodiments the AR presentation application 221 is configured to superimpose an indicator 400 on the mobile device display 230. In an embodiment, the indicator 400 is generally a graphical representation that highlights or outlines the object 320 and may be activatable (i.e., include an embedded link), such that the user 310 may "select" the indicator 400 and retrieve information related to the identified object. The indicator 400 may be a tab or link displayed such that the user 310 may "select" the indicator 400. In embodiments in which the indicator 400 provides an interactive tab to the user 310, the user 310 may select the indicator 400 by any conventional means, e.g., keystroke, touch, voice command, iris tracking, or the like, for interaction with the mobile device 200. For instance, in some embodiments, the user 310 may utilize an input device 240 such as a keyboard to highlight and select the indicator 400 in order to retrieve the information. In a particular embodiment, the mobile device display 230 includes a touch screen that the user may employ to select the indicator 400 utilizing the user's finger, a stylus, or the like. In yet other embodiments, the indicator information related to the identified object may be visualized by the user 310 without "selecting" the indicator 400. In some embodiments, the indicator 400 is not interactive and simply provides information to the user by superimposing the indicator 400 on the display 230. For example, in some instances it may be beneficial for the AR presentation application 221 to merely identify an object 320, e.g., just identify the document associated with the object, give brief information about the document, etc., rather than provide extensive detail that requires interaction with the indicator 400. The AR presentation application 221 is capable of being tailored to a user's desired preferences.

Furthermore, the indicator 400 may be displayed at any size on the mobile device display 230. The indicator 400 may be small enough that it is positioned on or next to the object 320 being identified such that the object 320 remains discernable behind the indicator 400. Additionally, the indicator 400 may be semi-transparent or an outline of the object 320, such that the object 320 remains discernable behind or enclosed by the indicator. In other embodiments, the indicator 400 may be large enough to completely cover the object 320 portrayed on the display 230. Indeed, in some embodiments, the indicator 400 may cover a majority or the entirety of the mobile device display 230. In a still further embodiment, the indicator 400 is displayed proximate the object 320 but when selected causes an image of the document to appear on the user's mobile device display 230.

The indicator 400 may relate to the document associated with the object, i.e., the identified document. In another embodiment, the indicator 400 relates to the user of the mobile device or to a financial transaction that can be conducted with the identified document. In an embodiment, the indicator 400 provides information to the user. The information may include any desired information associated with the identified document and may range from basic information to greatly detailed information. In some embodiments, the indicator 400 may provide the user 310 with a link to the document associated with the object 320. In a still further embodiment, the indicator 400 presents options to the user for controlling the document. For example, the indicator 400 may include tags that populate the document with libraries of user information, such as business user information or personal user information. The indicator 400 may also display various actions that can be taken regarding the document, such as autofill, submission, recording, printing, communicating, copying, applying, etc.

In some embodiments, selecting the indicator 400 will cause the AR presentation application 221 to automatically populate the document associated with the object, such as with the user's personal information. In some instances, the populating functionality may be a part of the AR presentation application 221. In other embodiments, the AR presentation application may access the user's accounts associated with a financial institution enabling the user 310 to select information that will be used to populate the document without having to input data such as a credit card number or billing address. In other embodiments, when the user 310 selects the indicator 400 to automatically populate the document, the AR presentation application 221 will activate the web browser application 222 to allow the user to submit the document over the Internet.

In some embodiments, selecting the indicator 400 will cause the computer-implemented method to send offers to the user of the mobile device. The alternative offers may be associated with the document. For example, an employer may use the computer-implemented method to target job applications to individuals that are applying for jobs with competitors. In another embodiment, the offer is tailored to the individual, such as by evaluating the user's financial or demographic information and tailoring the offer based on the information. For example, offers for job applications closer to the individual's home may be made to the user. In another embodiment, the current time or location when the offer is provided will be used to customize the offer. For example, if a personal itinerary is being populated with information from a plane ticket, the user may be provided offers to coffee shops in the airport in the morning and restaurants in the evening.

In another embodiment, selecting the indicator 400 allows the user to submit the document. In one embodiment, the user is able to immediately populate the document and then submit it. For example, a user may use the computer-implemented system and method to identify a job application for a business and then complete the job application with the user's information and submit the job application to the business. In a still further embodiment, the user is able to identify documents using the computer-implemented system and method and then conduct transactions, such as purchases, transfers, loans, gifts, or charitable donations using the document.

Turning now to FIG. 5, a block diagram illustrating an AR environment 500 wherein a document 502 is presented to the user 310 is provided, in accordance with an embodiment of the invention. The user 310 is using a mobile device 200 to capture an image of the environment 350 on a display 230. In an embodiment, the environment 350 may include multiple objects 320, such as signs, text, or symbols.

As discussed herein, the mobile device captures the objects 320 and the processor compares the objects to reference images stored in databases, such as an Augmented Reality (AR) database 514 or a financial institution database 512. The AR database 514 may store relationships between reference images, objects, markers, and associated documents. The financial institution database 512 may store information relating to the user, such as user data, personal data, financial data, and offers associated with the user or merchants. The mobile device 200 may communicate with the databases over a network 510.

The network 510 may be a global area network (GAN), such as the Internet, a wide area network (WAN), a local area network (LAN), or any other type of network or combination of networks. The network 510 may provide for wireline, wireless, or a combination wireline and wireless communication between devices on the network.

In some embodiments, the mobile device displays an indicator 400, such as a translation of text 506. The indicator 400 is displayed over top or adjacent to the text 506 in the display 230. The mobile device may display multiple indicators 400 on the screen. For example, a second indicator 400 associated with a different object, e.g., a symbol 508, may be displayed on the screen. In an embodiment, some indicators 400 may be activated in order to display the associated document. In the example related to the symbol 508, the indicator has not yet been activated and thus the document is not displayed.

In an embodiment, once the indicator 400 for an object 320 is selected, a document associated with the object 320 is provided to the user. For example, the display 230 may change from displaying the real-time video to displaying the document 502. In an embodiment, the mobile device 200 also populates fields 504 in the document 502 with the user's data. The user may cycle between the document 502 and the real-time video, overlay the document 502 on the real-time video, or submit the document 502. In this manner, the mobile device assists the user in managing documents through object recognition and document augmentation.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
|---|---|---|
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |

-continued

| U.S. Provisional Ser. No. | Filed On | Title |
| --- | --- | --- |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such to assist the user with commerce activity. The commerce activity may include, but is not limited to; conducting a transaction, providing information about a product/service, providing rewards based information, providing user-specific offers, or the like. In specific embodiments, the data that matched to the images in the real-time video stream is specific to financial institutions, such as user financial behavior history, user purchase power/transaction history and the like. In this regard, many of the embodiments herein disclosed leverage financial institution data, which is uniquely specific to financial institution, in providing information to mobile devices users in connection with real-time video stream analysis.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for populating a document with user information based on identification of an object associated with the document in an augmented reality environment, the method comprising:

receiving a request from a user, wherein the request is associated with populating one or more documents with information associated with a user, wherein the one or more documents comprises one or more indicators to assist in populating at least a portion of the document;

capturing a real-time video stream using a mobile device, wherein the mobile device includes a video camera and a screen for displaying the real-time video stream to the user, wherein the real-time video stream comprises an object;

analyzing, via a computing device processor, the video stream to identify the object based on at least one or more markers in a database, wherein identifying the object further comprises comparing the object in the real-time video stream with the one or more markers to determine a match;

extracting one or more data associated with the object from the real-time video stream, wherein the one or more data comprises user information;

identifying, via a computing device processor, the one or more documents associated with the object in the database based on at least comparing one or more markers used to identify the object with a reference image associated with the document stored in the database to determine a match;

initiate a presentation of a user interface on the screen of the device comprising the one or more identified documents, wherein the user interface enables the user to select at least one of the one or more identified documents to be populated;

displaying an image of the at least one selected document identified in the database on the screen of the device;

determining one or more additional information required to populate the at least one selected document, wherein the one or more additional information is associated with the user;

retrieving the one or more additional information from one or more personal documents associated with the user stored in a remote database, wherein retrieving further comprises extracting the one or more additional information from the one or more personal documents;

populating at least a portion of the at least one selected document with one or more data extracted from the object using the one or more indicators associated with the one or more documents and the one or more additional information retrieved from the one or more personal documents associated with the user; and displaying the at least one populated document to the user via the screen of the device.

2. The computer-implemented method of claim 1, wherein the indicator is associated with a financial transaction associated with the document.

3. The computer-implemented method of claim 2, wherein the indicator is the balance in at least one of the accounts after completion of the financial transaction associated with the document.

4. The computer-implemented method of claim 1, further comprising electronically submitting the document.

5. The computer-implemented method of claim 1, further comprising providing an offer to the user, wherein the offer is associated with the document.

6. An apparatus for populating a document with user information based on identification of an object associated with a document, the apparatus comprising:

a mobile device having a video camera and a screen for displaying a real-time video to a user;

a computing platform having a processor, a memory in communication with the processor, and requisition logic stored in the memory, executable by the processor and configured to receive a request from a user, wherein the request is associated with populating one or more documents with information associated with a user, wherein the one or more documents comprises one or more indicators to assist in populating at least a portion of the document;

image capture logic stored in the memory, executable by the processor and configured to capture a real-time video stream using the mobile device, wherein the real-time video stream comprises an object, and analysis logic stored in the memory, executable by the processor, and configured to analyze the video stream to identify the object based on at least one or more markers in a database, wherein the identifying the object further comprises comparing the object in the real-time video stream with the one or more markers to determine a match;

extraction logic stored in the memory, executable by the processor and configured to extract one or more data associated with the object from the real-time video stream, wherein the one or more data comprises user information; and image comparison logic stored in the memory, executable by the processor and configured to identify the one or more documents associated with the object in the database based on at least comparing one or more markers used to identify the object with a reference image associated with the document stored in the database to determine a match;

display logic stored in memory, executable by the processor, and configured to initiate a presentation of a user interface on the screen of the device comprising the one or more identified documents, wherein the user interface enables the user to select at least one of the one or more identified documents to be populated;

display logic configured to display an image of the at least one selected document identified in the database on the screen of the device;

information determination logic stored in memory, executable by the processor, and configured to determine one or more additional information required to populate the at least one selected document, wherein the one or more additional information is associated with the user;

information retrieving logic stored in memory, executable by the processor, and configured to retrieve the one or more additional information from one or more personal documents associated with the user stored in a remote database, wherein retrieving further comprises extracting the one or more additional information from the one or more personal documents;

document population logic stored in the memory, executable by the processor and configured to populate at least a portion of the at least one selected document with one or more data extracted from the object using the one or more indicators associated with the one or more documents and the one or more additional information retrieved from the one or more personal documents associated with the user; and display logic configured to display the at least one populated document to the user via the screen of the device.

7. The apparatus of claim 6, further comprising a positioning system device, wherein the document is identified based at least in part on a location of the object determined by the positioning system device.

8. The apparatus of claim 6, further comprising a networking device, wherein the reference image is received via the networking device.

9. The apparatus of claim 6, further comprising a microphone, wherein the document is identified at least in part on an audio recording of the object.

10. The apparatus of claim 6, further comprising an input device, wherein the user conducts a transaction using the populated document by actuating the input device.

11. The apparatus of claim 10, wherein the input device is a touch sensitive pad.

12. The apparatus of claim 6, wherein the reference image is stored in the memory.

13. A non-transitory computer-readable medium comprising computer-executable instructions for populating a document with user information based on identification of an object associated with a document, the instructions comprising:

instructions for receiving a request from a user, wherein the request is associated with populating one or more documents with information associated with a user, wherein the one or more documents comprises one or more indicators to assist in populating at least a portion of the document;

instructions for capturing a real-time video stream using a mobile device, wherein the mobile device includes a video camera and a screen for displaying the real-time video stream to the user, wherein the real-time video stream comprises an object;

instructions for analyzing, via a computing device processor, the video stream to identify the object based on at least one or more markers in a database, wherein identifying the object further comprises comparing the object in the real-time video stream with the one or more markers to determine a match instructions for extracting one or more data associated with the object from the real-time video stream, wherein the one or more data comprises user information;

instructions for identifying, via a computing device processor, the one or more documents associated with the object in the database based on at least comparing one or more markers used to identify the object with a reference image associated with the document stored in the database to determine a match;

instructions for initiating a presentation of a user interface on the screen of the device comprising the one or more identified documents, wherein the user interface enables the user to select at least one of the one or more identified documents to be populated;

instructions for displaying an image of the at least one document identified in the database on the screen of the device;

instructions for determining one or more additional information required to populate the at least one selected document, wherein the one or more additional information is associated with the user;

instructions for retrieving the one or more additional information from one or more personal documents associated with the user stored in a remote database, wherein retrieving further comprises extracting the one or more additional information from the one or more personal documents;

instructions for populating at least a portion of the at least one selected document with one or more data extracted from the object using the one or more indicators associated with the one or more documents and the one or more additional information retrieved from the one or more personal documents associated with the user; and instructions for displaying the at least one populated document to the user via the screen of the device.

14. The computer program product of claim 13, where the user information is financial information of a user.

15. The computer program product of claim 13, further comprising instructions for receiving input from a user, wherein the input causes the document to be submitted to a third party.

16. The computer program product of claim 15, wherein the input is received from a touch sensitive screen.

17. The computer program product of claim 13, further comprising instructions for receiving information from a financial institution database, wherein the information is used to populate the document.

* * * * *